United States Patent Office 3,078,260
Patented Feb. 19, 1963

3,078,260
CURE OF ELASTOMERS CONTAINING ALKYL ALKACRYLATES
Robert A. Hayes, Cuyahoga Falls, Ohio, assignor to The Firestone Tire & Rubber Company, Akron, Ohio, a corporation of Ohio
No Drawing. Filed Apr. 13, 1960, Ser. No. 21,861
7 Claims. (Cl. 260—83.5)

This invention relates to curing elastomeric copolymers of a conjugated diene and an alkyl alkacrylate. The cure is effected with a primary curing agent composed of barium hydroxide and sufficient water (combined or uncombined) to cause the ester group of the copolymer to hydrolyze, with consequent reaction of the barium hydroxide with at least some of the resulting acid groups whereby two copolymer chains are cross-linked by barium, producing the barium salt. Ordinarily, not all of the ester groups will be hydrolyzed, partial reaction being sufficient, as is well known in the art. The preferred curing agent is barium hydroxide octahydrate, $$Ba(OH)_2 \cdot 8H_2O$$

A mixture of water and barium oxide or barium hydroxide can be used, or a mixture of barium hydroxide octahydrate with barium oxide or barium hydroxide. Whatever its form, the primary curing agent is essentially water and barium hydroxide, and will be referred to as such herein. For most operations, a secondary curing agent such as sulfur or a peroxide will be used. It has been found that an epoxy resin can be used as the secondary curing agent when barium hydroxide octahydrate is present.

Vulcanizates of copolymers of dienes and acrylic or methacrylic acid obtained with metal oxides are well known to the art and have outstanding physical properties. However, the processing of these copolymers on conventional rubber mixing equipment is extremely difficult because the acidic portion of the copolymer reacts with the metal oxide during the mixing operation, producing at least partial curing which causes the elastomer to stiffen during the mixing. Neither barium hydroxide octahydrate nor any of the foregoing curing mixtures reacts on mixing, but reacts on subsequent heating to produce vulcanizates. The water present (either free or combined) hydrolyzes the alkacrylate ester when heat is applied during the vulcanization of the copolymer, and essentially the same product is produced as is obtained by vulcanizing a difficultly processable mixture of barium oxide or hydroxide and an acrylic acid or alkacrylic acid copolymer of a conjugated diene.

The amount of water (combined or uncombined) in the curing agent is 3 to 8 molecules of water per 1 molecule of barium hydroxide. The preferred amount of primary curing agent used contains substantially 7 to 8 parts by weight of barium hydroxide per 100 parts of copolymer. More generally, it contains at least 3 parts of barium hydroxide and up to, for example, 15 or more parts of barium hydroxide per 100 parts of the copolymer.

So far as is known, the prior proposals for vulcanizing with metal oxides and hydroxides are ineffective with copolymers containing an alkacrylate. For example, it has been proposed to treat copolymers containing acrylates with calcium hydroxide (Cooper, W. and Bird, T. B., The Cross-Linking of Butadiene-Acrylate Elastomers by Base, presented at the Montreal meeting of the Rubber Division of the American Chemical Society, May 17, 1957), but that procedure does not apply to copolymers containing alkacryates.

The use of barium hydroxide and water, as described herein, for the curing of copolymers containing alkacrylates results in a vulcanizate having good properties. It has high strength, particularly at higher temperatures as, for example, around 400° F. The vulcanizates are particularly suited for the the treads of tires (particularly for aircraft), etc.

The elastomers will contain 50% or more (by weight) of butadiene or isoprene or a mixture thereof. Twenty to fifty percent of the coplymer will be an alkyl alkacrylate in which the alkyl group is methyl or ethyl, and the alkacrylate is methacrylate or ethacrylate. A mixture of such alkyl alkacrylates can be used. The copolymer does dot contain any carboxyl groups but can contain up to 30% of one or more other ethylenically unsaturated monomers such as styrene, methylstyrene, acrylonitrile, methacrylonitrile, etc. The invention will be described more particularly with reference to the copolymer obtained by emulsion copolymerization of 70 parts by weight of butadiene and 30 parts by weight of methyl methacrylate. Other elastomers which can be employed include:

Isoprene-methyl methacrylate
Butadiene-ethyl methacrylate
Butadiene-methyl ethacrylate
Butadiene-methyl methacrylate-styrene
Butadiene-ethyl methacrylate-acrylonitrile
Isoprene-methyl methacrylate-acrylonitrile, etc.

The secondary curing agents are (1) diepoxides and polyepoxides such as are obtained by the reaction of epichlorhydrin on a di- or poly-hydric phenol, vinylcyclohexene dioxide, butadiene dioxide, etc., including 3,4-epoxy-6-methylcyclo - hexylmethyl - 3,4 - epoxy - 6-methylcyclohexane carboxylate and commercially available epoxidized oils such as Paraplex G–60 and Emery 3051–R which are understood to be predominantly epoxidized triglycerides of unsaturated fatty acids; and (2) peroxides such as dicumyl peroxide, benzoyl peroxide, dilauroyl peroxide, and other curing peroxides known in the rubber art. The commercial product Di Cup 40 C is dicumyl peroxide (40%) precipitated on calcium carbonate (60%).

Unless a secondary curing agent is used in curing, the vulcanizate is somewhat thermoplastic. Using both a primary and a secondary curing agent, vulcanizates are obtained which have good physical properties at high temperatures, as will be shown below.

The amount of secondary curing agent required will vary widely depending upon the particular type of secondary curing agent used and its molecular weight. For example, 1 to 4 parts of Di Cup 40 C can be used. About 2 parts gives optimum results.

The amount of epoxide used will depend on the epoxy content of the compound. For example, 3 to 8 parts of Epon 828 can be used. It is a condensation product of epichlorhydrin and p,p'-isopropylidenediphenol (Bisphenol A) which has an epoxide equivalent of about 175 to 210 and a melting point of about 8–12° C. About 5 parts gives optimum results. More than 8 parts can be used without detrimental effect, but likewise without appreciable increased beneficial effect.

In the following tables, the compounding formulae refer to parts by weight. "Modulus" (as a designation in the tables) is the 200 percent modulus given in p.s.i. "Tensile" is the tensile strength at break given in p.s.i. "Elongation" is the percentage elongation at break.

In both tables of the test results, the expression, BD-MMA Elastomer is used to refer to elastomer prepared from the following formula:

| | Parts by weight |
|---|---|
| Butadiene | 70 |
| Methyl methacrylate | 30 |
| Water | 180 |
| Potassium persulfate | 0.4 |
| Sulfole B8 [1] | 0.3 |
| Soap flakes | 4.0 |

[1] Sulfole B8 is mixed tertiary dodecyl mercaptans.

The emulsion is polymerized at 50° C. to 60–75% conversion. Usually about 6 hours is required. The polymerization is stopped with any usual short-stopping agent. Antioxidant is advantageously added. The copolymer is then coagulated with aqueous calcium chloride solution and dried in an oven.

In the formulae of Table I, pine tar is used as a softener. Magnesium oxide and barium oxide are familiar fillers. The table gives several compounding formulae, and the properties of the resulting vulcanizates when heated to different temperatures, each vulcanizate being obtained by curing 60 minutes at 320° F.:

*Table I*

| Stock | 1 | 2 | 3 | 4 | 5 | 6 |
|---|---|---|---|---|---|---|
| BD-MMA Elastomer | 100 | 100 | 100 | 100 | 100 | 100 |
| HAF Black | 40 | 40 | 40 | 40 | 40 | 40 |
| Ba(OH)$_2$.8H$_2$O | 20 | 20 | 20 | 10 | 10 | 15 |
| Pine Tar | 10 | 5 | 5 | 5 | 5 | 0 |
| Epon Resin 828 | 4 | 5 | 5 | 0 | 0 | 0 |
| Magnesium Oxide | 0 | 0 | 4 | 0 | 0 | 0 |
| Barium Oxide | 0 | 10 | 0 | 0 | 0 | 0 |
| Stearic Acid | 0 | 0 | 0 | 1 | 1 | 0 |
| Zinc Oxide | 0 | 0 | 0 | 5 | 3 | 0 |
| Sulfur | 0 | 0 | 0 | 1 | 0 | 0 |
| Di Cup 40 C | 0 | 0 | 0 | 1 | 2 | 2 |
| 2,2'-Dithiobisbenzothiazole | 0 | 0 | 0 | 1.2 | 0 | 0 |
| N-phenyl-2-naphthylamine | 2 | 2 | 2 | 2 | 2 | 2 |
| Tensile Properties at 73° C.: | | | | | | |
| Modulus | 2,600 | 3,225 | 3,475 | 650 | 500 | 1,300 |
| Tensile | 2,925 | 3,425 | 3,800 | 3,575 | 2,250 | 3,650 |
| Elongation | 240 | 230 | 240 | 630 | 600 | 490 |
| Tensile Properties at 400° F.: | | | | | | |
| Modulus | | 990 | 380 | 310 | 250 | 410 |
| Tensile | 600 | 1,360 | 900 | 540 | 530 | 930 |
| Elongation | 130 | 370 | 500 | 350 | 360 | 420 |

It is noticed from the table that all of the tensile strengths at 400° F. are above 500 pounds per square inch. A conventionally cured diene elastomer will have considerably less than 500 pounds per square inch tensile strength at 400° F. Thus, the vulcanizates of this invention have unusually good properties at elevated temperatures, such as the high temperatures produced in airplane tires upon landing at jet speeds.

Each of the stocks of the table contained a secondary curing agent in addition to the barium hydroxide octahydrate used for the primary cure. Stock Nos. 1–3 illustrate the use of an epoxide. Stock No. 4 illustrates the use of sulfur. Stock Nos. 5 and 6 illustrate the use of peroxides. The table is illustrative of three different types of curing agents used in addition to the barium hydroxide octahydrate. Any substance which will cure a diene elastomer can, of course, be used in conjunction with the primary curing agent. The barium and magnesium oxides present in stock Nos. 2 and 3 are advantageous because they act as reinforcing agents in this particular type of stock.

Table II gives formulae using different metal oxides and hydroxides, and also formulae using water with magnesium oxide and barium oxide. All of the stocks were cured for 75 minutes at 320° F.

*Table II*

| Stocks | A | B | C | D | E | F | G | H |
|---|---|---|---|---|---|---|---|---|
| BD-MMA Elastomer | 100 | 100 | 100 | 100 | 100 | 100 | 100 | 100 |
| HAF Black | 40 | 40 | 40 | 40 | 40 | 40 | 40 | 40 |
| Epon Resin 828 | 4 | 4 | 4 | 4 | 4 | | | |
| Ba(OH)$_2$.8H$_2$O | 16 | | | | | | | |
| Barium Oxide | | 16 | | | | 13 | 13 | 13 |
| Calcium Hydroxide | | | 20 | | | | | |
| Cadmium Hydroxide | | | | 20 | | | | |
| Magnesium Oxide | | | | | 8 | | | |
| Water | | | | | 6.4 | 1.6 | 3.2 | 6.4 |

The physical properties of Stocks A and B are tabulated here:

| Stocks | A | B |
|---|---|---|
| Modulus | 1,700 | 150 |
| Tensile strength | 3,600 | 150 |
| Elongation | 360 | 600 |

The low modulus and tensile strength combined with the high elongation for Stock B show that it was only partially cured. The barium hydroxide octahydrate produced a good cure; barium oxide alone is not a good curing agent.

Stocks C to H, after heating for 75 minutes at 320° F., as described, were tested by the thumb and tooth test. Stocks C and D, which contained calcium hydroxide and cadmium hydroxide, respectively, and Stocks E, F and G, each of which contained a metal oxide and water gave no cure. Although the metal oxide in Stocks F and G was barium oxide, there was not enough water present to produce a cure. Stock H was cured on heating. The ratio of the moles of water to molecules of barium hydroxide in Stocks F, G and H was:

Stock F: Sufficient water to convert BaO to Ba(OH)$_2$
Stock G: Sufficient water to form Ba(OH)$_2$.1H$_2$O
Stock H: Sufficient water to form Ba(OH)$_2$.3H$_2$O Stocks F, G and H contained no secondary curing agent. The results show that in the absence of a secondary curing agent, at least three molecules of water per molecule of barium hydroxide is required to obtain a cure.

Using less barium hydroxide octahydrate than is required to give a desired cure, barium oxide or barium hydroxide can be added to bring the total barium content to the desired amount, provided the total water present is three to eight molecular equivalents for each molecular equivalent of the total barium hydroxide.

Thus, the foregoing formulae and curing conditions are illustrative. It will be appreciated that other compounding ingredients can be employed in the invention as, for examle, different antioxidants, epoxides, peroxides, and other compounding ingredients known in the rubber art. The time and temperature of cure can likewise be varied as will be appreciated by the man skilled in the art, e.g., from several hours at 250° F. to a few minutes at 400° F.

In any of the claims the specified amount of barium hydroxide and water can be present in either combined or uncombined form. The water is advantageously added as the octahydrate of barium hydroxide because of the difficulty of adding water separately on a mill, and the difficulty of keeping water in a Banbury.

This application is a continuation-in-part of my application Serial No. 727,282, filed April 9, 1958, now abandoned. The invention is covered in the claims which follow.

What I claim is:

1. The process of curing polymeric elastomers containing (1) at least 50 percent by weight of a conjugated diene from the class consisting of butadiene and isoprene and (2) between 20 and 50 percent by weight of an alkyl alkacrylate from the class consisting of methyl and ethyl methacrylates and ethacrylates, which process comprises heating the same to curing temperature with barium hydroxide and substantially 3 to 8 molecules of water for each molecule of barium hydroxide until a cure is obtained, the amount of barium hydroxide present being sufficient to effect the desired cure, the weight of the barium hydroxide being 3 to 15 parts per 100 parts of the elastomer.

2. The process of claim 1 in which the cure is a primary cure and it is carried out in the presence of a secondary curing agent which is an epoxide from the class consisting of diepoxides and polyepoxides.

3. The process of claim 1 in which the cure is a primary cure and it is carried out in the presence of a secondary curing agent which is a peroxide.

4. The process of claim 1 in which the copolymer consists of butadiene and methyl methacrylate.

5. The process of claim 1 in which the copolymer consists of butadiene and methyl methacrylate, the primary cure is made in the presence of substantially 3 to 15 parts of barium hydroxide and the cure is made in the presence of a secondary curing agent which is substantially 0.4 to 2 parts of dicumyl peroxide, by weight, per 100 parts of the copolymer.

6. The process of claim 1 in which the barium hydroxide and water are added as barium hydroxide octahydrate which is mixed with the elastomer as a compounding ingredient.

7. The process of claim 1 in which the cure is enhanced by the presence of a secondary curing agent which is a curing agent for a diene elastomer.

References Cited in the file of this patent

UNITED STATES PATENTS 2,849,426   Miller _____ Aug. 26, 1958

OTHER REFERENCES

Braden: Trans. I.R.I., vol. 31, No. 6, December 1955, pages 155–65.

Condensed Chemical Dictionary (Rose et al.), published by Reinhold (N.Y.), 1961, page 129, 5th ed.